United States Patent
Sung et al.

(10) Patent No.: US 12,287,191 B2
(45) Date of Patent: Apr. 29, 2025

(54) MEASUREMENT DEVICE AND MEASUREMENT METHOD FOR MEASURING ROUNDNESS OF COATING ROLL FOR MANUFACTURING BATTERY

(71) Applicant: LG Energy Solution, Ltd., Seoul (KR)

(72) Inventors: Jae Young Sung, Daejeon (KR); Joon Sun Park, Daejeon (KR); Chae Gyu Lee, Daejeon (KR); Duck Joong Yun, Daejeon (KR); Jeong Yong Lee, Daejeon (KR); Woo Jin An, Daejeon (KR); Koo Youn Hwang, Daejeon (KR); Won Hak Cho, Daejeon (KR); Jin Ki Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 177 days.

(21) Appl. No.: 17/914,616

(22) PCT Filed: Jan. 5, 2022

(86) PCT No.: PCT/KR2022/000163
§ 371 (c)(1),
(2) Date: Sep. 26, 2022

(87) PCT Pub. No.: WO2022/154362
PCT Pub. Date: Jul. 21, 2022

(65) Prior Publication Data
US 2023/0118174 A1 Apr. 20, 2023

(30) Foreign Application Priority Data
Jan. 13, 2021 (KR) .................. 10-2021-0004364

(51) Int. Cl.
*G01B 21/12* (2006.01)
*H01M 10/04* (2006.01)

(52) U.S. Cl.
CPC ........ *G01B 21/12* (2013.01); *H01M 10/0404* (2013.01)

(58) Field of Classification Search
CPC ............... G01B 21/12; G01B 11/2408; G01B 11/2441; G01B 11/255; G01B 11/08; G01B 11/10; G01B 11/105; H01M 10/0404
See application file for complete search history.

(56) References Cited

U.S. PATENT DOCUMENTS

| | | | |
|---|---|---|---|
| 5,117,081 A | 5/1992 | Bagdal | |
| 2005/0050745 A1* | 3/2005 | Akatsuka | G01B 11/2408 33/549 |
| 2010/0112452 A1 | 5/2010 | Nishimura et al. | |

FOREIGN PATENT DOCUMENTS

| | | |
|---|---|---|
| CN | 101652886 A | 2/2010 |
| CN | 203224217 U | 10/2013 |
| | (Continued) | |

OTHER PUBLICATIONS

Extended European Search Report for Application No. 22739560.5 dated Aug. 25, 2023. 7 pgs.
(Continued)

*Primary Examiner* — Tarifur R Chowdhury
*Assistant Examiner* — Jonathon Cook
(74) *Attorney, Agent, or Firm* — Lerner David LLP

(57) ABSTRACT

Disclosed herein is a roundness measuring device and a roundness measuring method of a coating roll for battery manufacturing. The roundness measuring device of a coating roll that supports an electrode sheet when the electrode sheet is coated with an electrode slurry, the roundness measuring device comprising: a displacement sensor spaced apart from the coating roll and configured to measure roundness of the coating roll in a non-contact manner; and a support member on which the displacement sensor is installed and which extends in a length direction of the (Continued)

coating roll, wherein the displacement sensor is installed as a plurality of displacement sensors on the support member in the length direction of the coating roll.

14 Claims, 9 Drawing Sheets

(56) References Cited

FOREIGN PATENT DOCUMENTS

| | | | |
|---|---|---|---|
| CN | 107078285 A | 8/2017 |
| CN | 107664483 A | 2/2018 |
| CN | 207134439 U | 3/2018 |
| CN | 210603124 U | 5/2020 |
| CN | 210847737 U | 6/2020 |
| JP | H07-069151 B2 | 7/1995 |
| JP | H0769151 B2 * | 5/1997 |
| JP | 2000230810 A | 8/2000 |
| JP | 2000230811 A | 8/2000 |
| JP | 2012-225848 A | 11/2012 |
| JP | 2017087186 A | 5/2017 |
| JP | 2019179042 A | 10/2019 |
| KR | 20090066045 A | 6/2009 |
| KR | 100948242 B1 | 3/2010 |
| KR | 101251007 B1 | 4/2013 |
| KR | 101462599 B1 | 11/2014 |
| KR | 101556857 B1 | 10/2015 |
| KR | 101654641 B1 | 9/2016 |
| KR | 20170117788 A | 10/2017 |
| KR | 101810025 B1 | 12/2017 |
| KR | 20180114380 A | 10/2018 |

OTHER PUBLICATIONS

International Search Report for PCT/KR2022/000163 mailed Apr. 29, 2022. 3 pgs.

Search Report dated Jan. 13, 2025 from the Office Action for Chinese Application No. 202280003287.6 Issued Jan. 16, 2025, pp. 1-3. [See pp. 1-2, categorizing the cited references].

* cited by examiner

[FIG. 1]
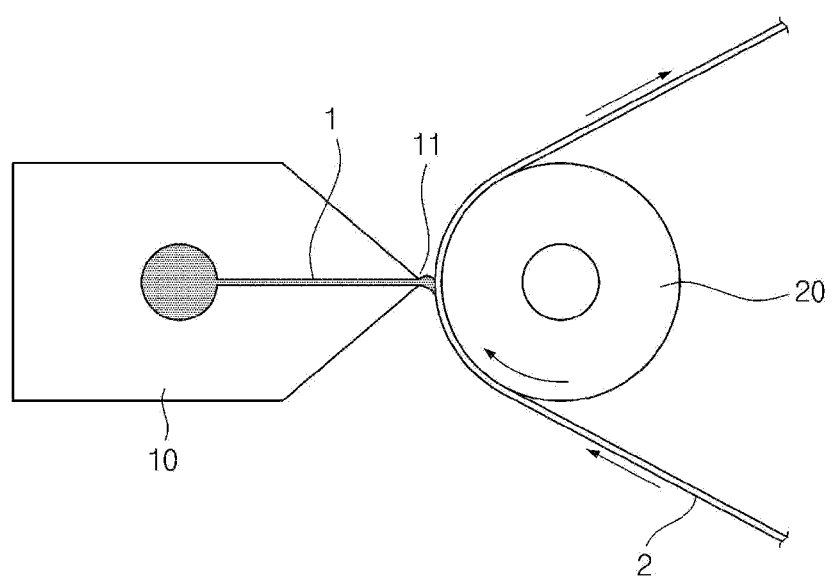

[FIG. 2]
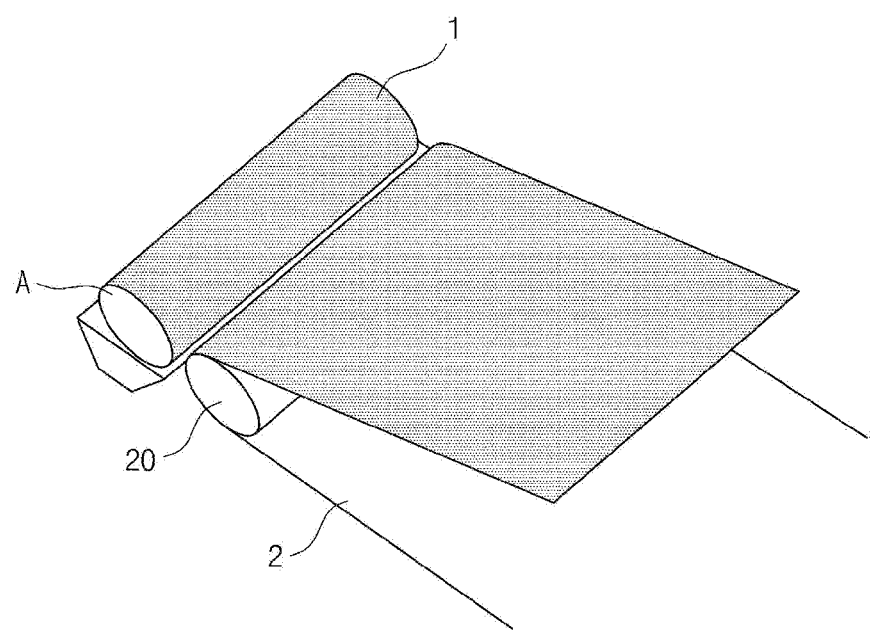

[FIG. 3]
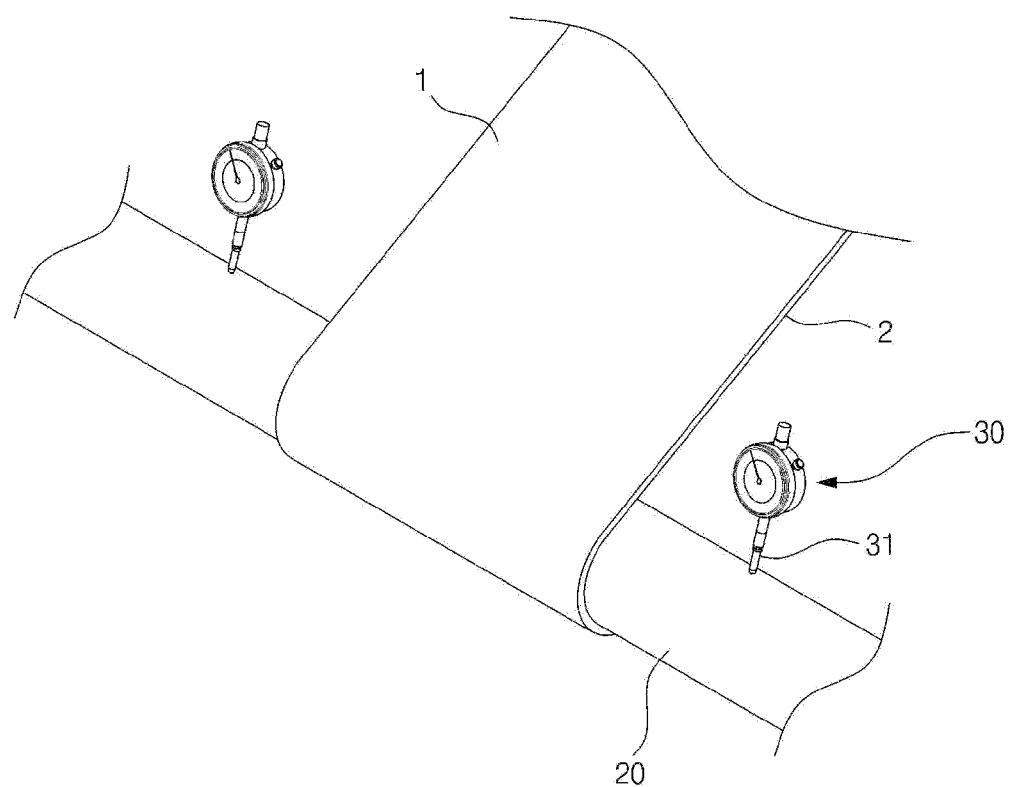

[FIG. 4]
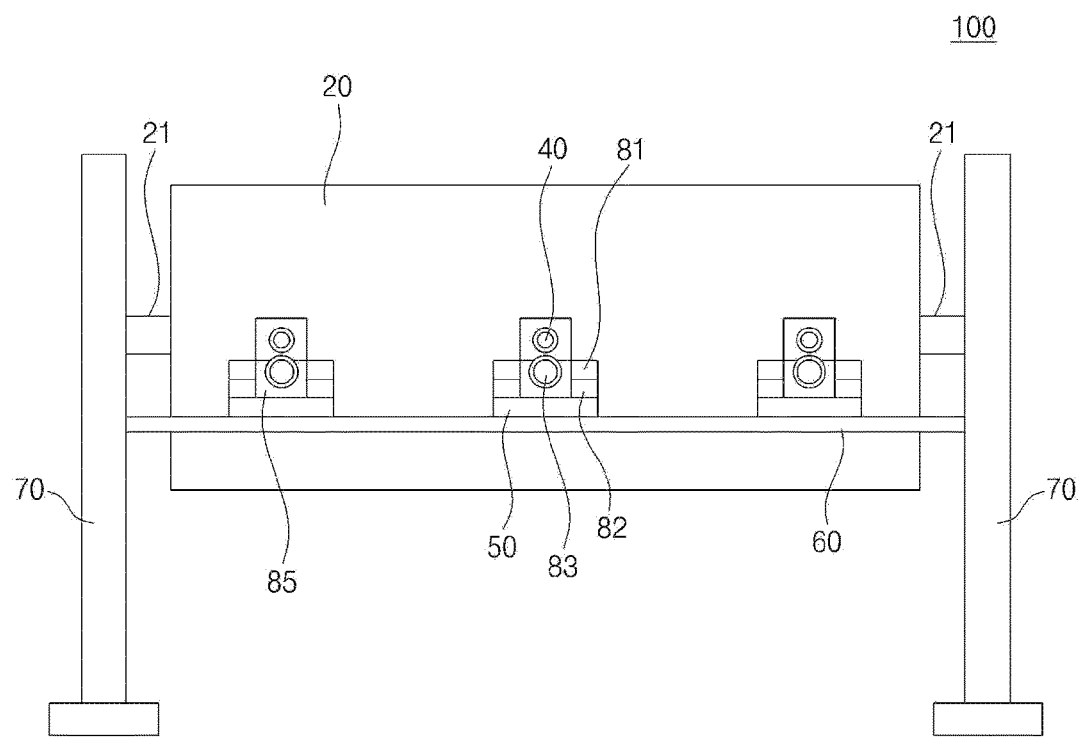

【FIG. 5】
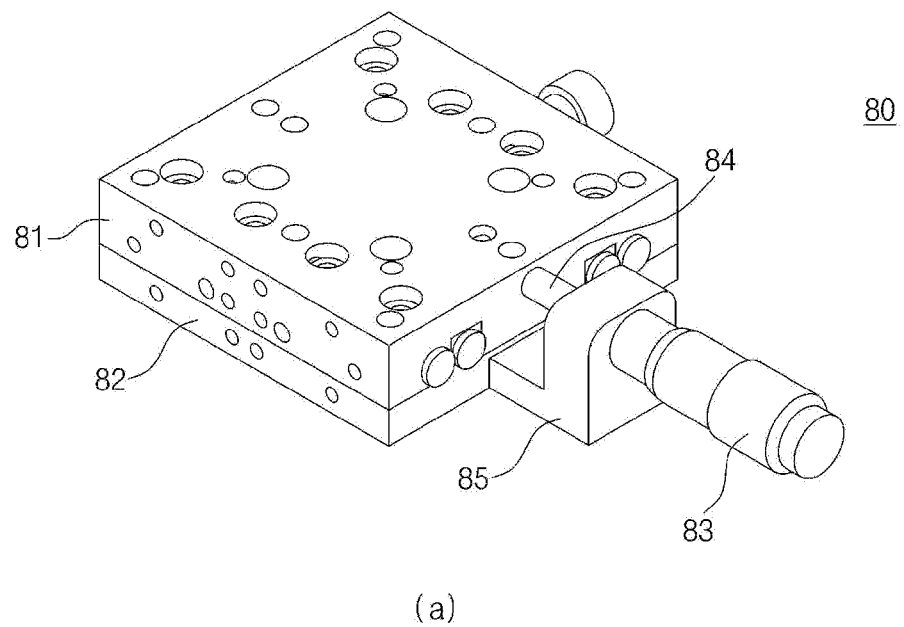
(a)
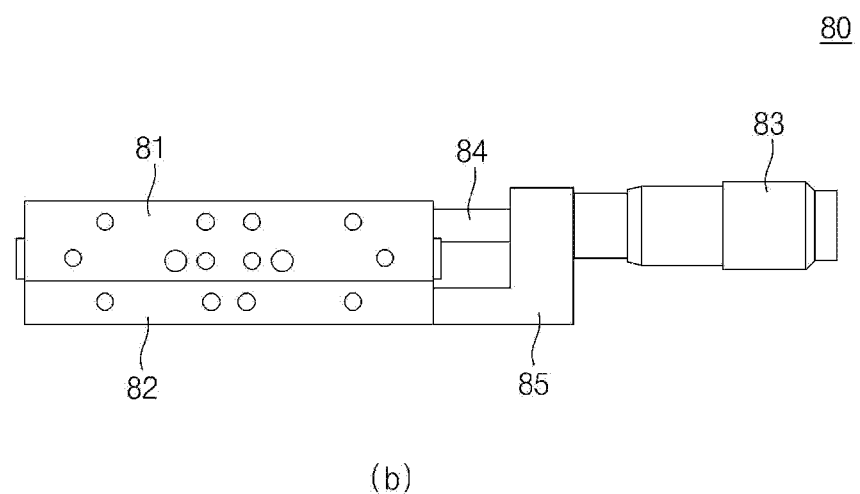
(b)

[FIG. 6]
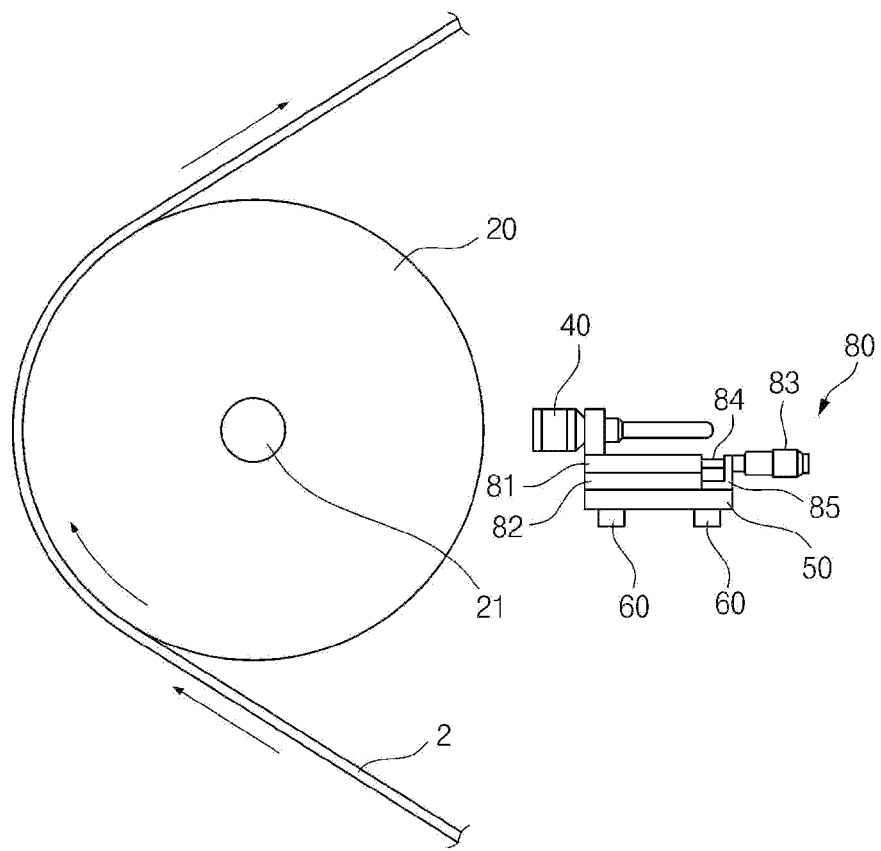

[FIG. 7]
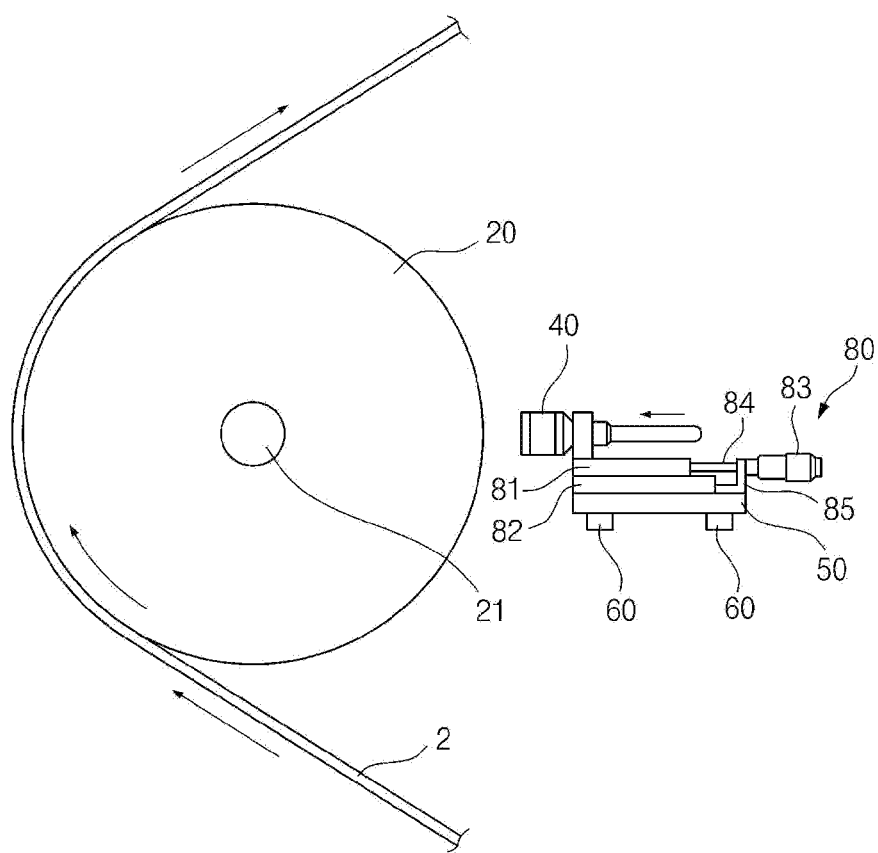

[FIG. 8]
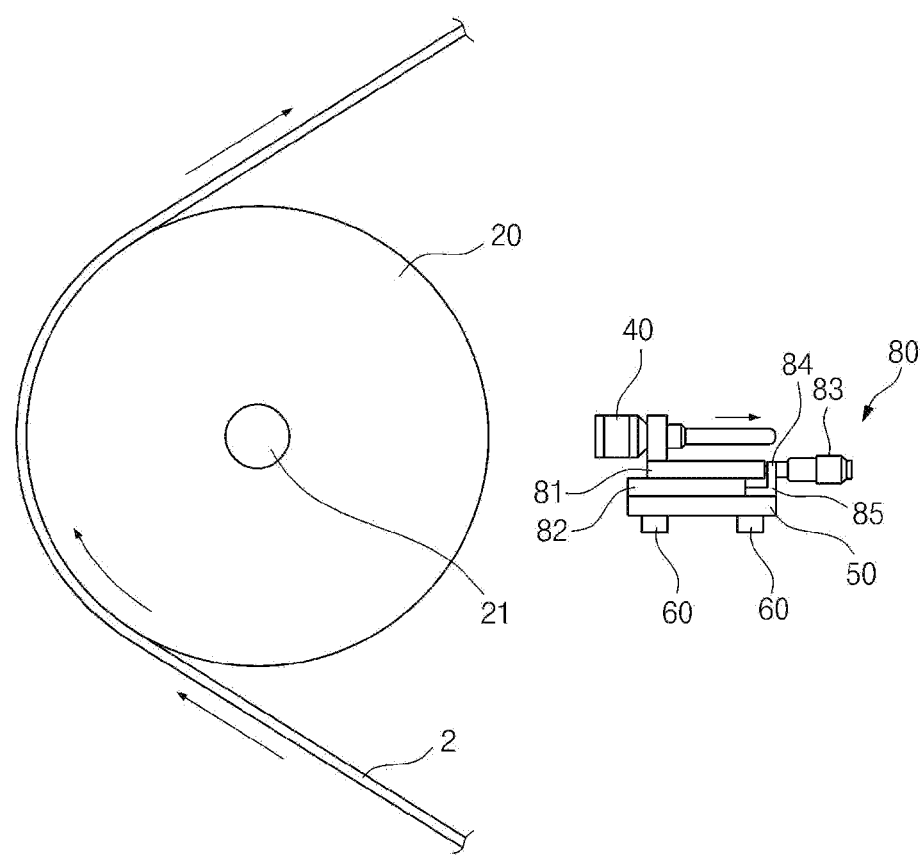

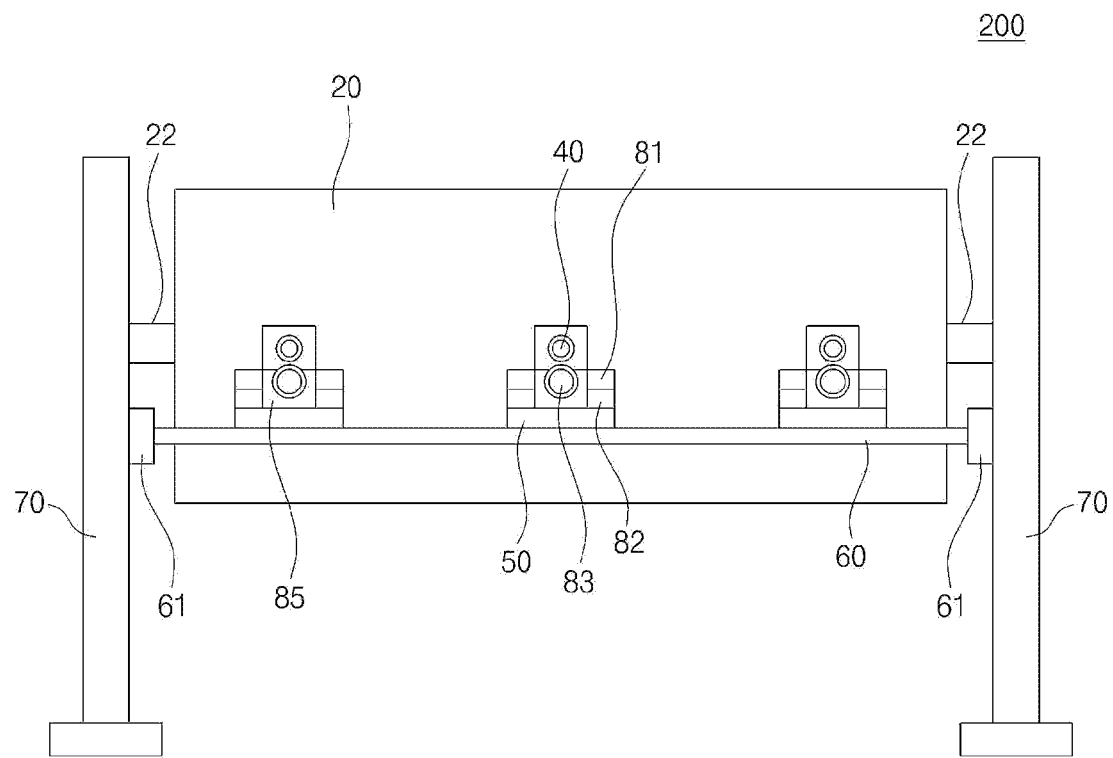
[FIG. 9]

MEASUREMENT DEVICE AND MEASUREMENT METHOD FOR MEASURING ROUNDNESS OF COATING ROLL FOR MANUFACTURING BATTERY

CROSS REFERENCE TO RELATED APPLICATION(S)

The present application is a national stage entry under 35 U.S.C. § 371 of International Application No. PCT/KR2022/000163 filed on Jan. 5, 2022, which claims priority based on Korean Patent Application No. 10-2021-0004364 dated Jan. 13, 2021, the disclosures of which are incorporated herein by reference in their entirety.

TECHNICAL FIELD

The present invention relates to a roundness measuring device and a roundness measuring method of a coating roll for battery manufacturing. More specifically, the present invention relates to a roundness measuring device and a roundness measuring method, which are capable of accurately measuring the roundness of a coating roll by measuring the roundness of the coating roll in a non-contact manner and, simultaneously, reducing a measurement error during measurement.

BACKGROUND ART

As the price of energy sources increases due to the depletion of fossil fuels and interest in environmental pollution is increased, the demand for eco-friendly alternative energy sources is becoming an indispensable factor for future life. In particular, as the technology development and the demand for mobile devices increase, the demand for secondary batteries as energy sources is rapidly increasing.

Generally, unlike primary batteries not capable of being charged, secondary batteries refer to batteries capable of being charged and discharged, and such secondary batteries are widely used in various fields such as mobile phones, notebook computers, and vehicles.

Electrodes of such secondary batteries are manufactured through coating metal bases with electrode slurries, in which active materials and conductive materials are mixed, heating and drying the resultants, and performing a rolling process.

The coating process includes a slot die coating method of discharging the electrode slurry onto the metal base (a current collector) using a slot die, and a roll coating method in which the electrode slurry is applied to a rotating roll and then the rotating roll is rotated to transfer the electrode slurry to the current collector.

FIG. 1 is a diagram illustrating that electrode slurry coating is performed by a slot die coating method.

As shown in the drawing, a slot die 10 is supported by a coating roll 20 (a backup roll) and electrode slurry 1 is discharged with respect to a continuously running metal base 2 from a lip 11 of the slot die 10 to coat the metal base 2 with the electrode slurry 1.

FIG. 2 is a diagram illustrating that the coating with the electrode slurry 1 is performed by a roll coating method.

In the roll coating method, a rotating roll A to which the electrode slurry 1 is applied rotates, the metal base 2 is moved in a state of coming into close contact with the rotating roll A, and the electrode slurry 1 applied on the rotating roll A is transferred to the metal base 2. Like FIG. 1, even in the roll coating method, the metal base 2 is supported by the coating roll 20 (a backup roll).

As described above, the metal base (a current collector sheet) to which the electrode slurry is applied is supported by the coating roll, continuously moved according to the rotation of the coating roll and is coated with the electrode slurry. Since the coating roll supports the metal base and, simultaneously, serves to guide the metal base, the coating roll is referred to as a backup roll or a guide roll.

Meanwhile, during the coating with the electrode slurry, an amount of electrode slurry loaded in a width direction (a TD direction) and a running direction (a length direction: an MD direction) of the metal base should be uniform for excellent coating quality. Among these directions, although there are several causes of a loading deviation in the running direction, a variation in roundness of the coating roll is determined as a main cause. The variation in roundness of the coating roll means that a coating gap varies with periodicity.

According to the related art, as shown in FIG. 3, in order to evaluate the roundness of the coating roll, a physical contact method through a dial gauge 30 is employed. That is, the roundness of the coating roll is evaluated by bringing a measuring point 31 of the dial gauge 30 into contact with a surface of the coating roll, magnifying the minute movement of a spindle using a gear device, reading a size indicated on a scale, and comparing a length.

However, since the measurement method is a method in which the coating roll is in direct contact with the dial gauge, there are the following problems.

First, since the dial gauge is in direct contact with the coating roll, because an equipment line is inevitably stopped so as to measure the roundness or the roundness is inevitably measured at a low speed (2 m/min or less), it is not possible to measure the roundness at an actual line operating speed.

Second, since the measurement method is a physical contact method, it has a limitation in that only an outer periphery of a coating area, which is irrelevant even when scratches occur, is measured, and it is difficult to measure the roundness of an important actual coating portion.

Third, according to a skill level of a measuring person operating the dial gauge, measurement errors inevitably occur.

Therefore, it is desired to develop a technology capable of accurately measuring the roundness of a coating roll at an actual line operating speed.

RELATED ART DOCUMENT

Patent Document

Korean Patent Laid-Open Application No. 10-2018-0114380

DISCLOSURE

Technical Problem

An abject of the present invention is to provide a roundness measuring device and a roundness measuring method of a coating roll for battery manufacturing, which are capable of measuring the roundness of a coating roll at an actual line operating speed.

Another abject of the present invention is to provide a roundness measuring device and a roundness measuring method of a coating roll for battery manufacturing, which are capable of measuring the coaxiality of the coating roll by measuring the roundness of the coating roll at a plurality of points.

Still another abject of the present invention is to provide a roundness measuring device and a roundness measuring method of a coating roll for battery manufacturing, which are capable of accurately measuring the roundness of an outer periphery of the coating roll and the roundness of an actual coating portion in which actual coating is performed without an error due to a measuring person.

Technical Solution

A roundness measuring device of a coating roll, which supports an electrode sheet when the electrode sheet is coated with an electrode slurry, includes a displacement sensor spaced apart from the coating roll and configured to measure the roundness of the coating roll in a non-contact manner, and a support member on which a displacement sensor is installed and which extends in a length direction of the coating roll, wherein the displacement sensor is installed as a plurality of displacement sensors on the support member in the length direction of the coating roll.

The displacement sensor may be installed at a rear side of the electrode sheet coated with the electrode slurry.

The displacement sensor may be installed as a total of three displacement sensors to face positions of a left side, a center, and a right side of the coating roll.

The coaxiality of the coating roll may be measured through measurement of the roundness using the three displacement sensors.

The displacement sensor may be installed in a direction perpendicular to a central axis line of the coating roll.

The support member may be coupled to a support frame installed adjacent to both ends of the coating roll.

The roundness measuring device may further include a linear movement mechanism configured to move the displacement sensor forward and backward to allow the displacement sensor to approach and be separated from the coating roll, and the linear movement mechanism may be mounted on the support member.

The linear movement mechanism may include a micro stage, and the displacement sensor may be mounted on the micro stage to be moved forward and backward.

A zero point of the displacement sensor may be adjusted by the forward and backward movement of the displacement sensor by the micro stage.

Magnet members may be installed at both ends of the support member, and the magnet members may be attached at predetermined positions of the support frame.

A roundness measuring method of a coating roll for battery manufacturing, which includes installing a plurality of displacement sensors in a length direction of a coating roll to be spaced apart from the coating roll, includes consecutively measuring outer diameters of the coating roll at positions facing the displacement sensors as the coating roll is rotated, and calculating the roundness of the coating roll by consecutively measuring the outer diameters of the coating roll.

Advantageous Effects

In accordance with the present invention, since the roundness of a coating roll is measured in a non-contact manner, it is possible to measure the roundness of the coating roll corresponding to an actual coating part according to an operating speed of an equipment line in real time.

In addition, it is possible to measure not only the roundness of the coating roll but also coaxiality using a plurality of displacement sensors.

In addition, there is an effect of accurately measuring the roundness and the coaxiality of the coating roll without a deviation between measuring persons due to a zero adjustment function by a micro stage.

BRIEF DESCRIPTION OF THE DRAWINGS

FIG. 1 is a diagram illustrating that electrode slurry coating is performed by a slot die coating method.

FIG. 2 is a diagram illustrating that electrode slurry coating is performed by a roll coating method.

FIG. 3 is a schematic diagram illustrating showing a coating roll roundness measuring method using a conventional dial gauge.

FIG. 4 is a front view illustrating a roundness measuring device of a coating roll for battery manufacturing according to one embodiment of the present invention.

FIG. 5 shows a perspective view and a side view of a micro stage which is a component applied to the embodiment of FIG. 4.

FIG. 6 is a side view illustrating the roundness measuring device of a coating roll for battery manufacturing according to the embodiment of FIG. 4.

FIG. 7 is a side view illustrating operation of a micro stage and a zero point adjustment process of a displacement sensor according to the embodiment of FIG. 4.

FIG. 8 is a side view illustrating the operation of the micro stage and the zero point adjustment process of the displacement sensor according to the embodiment of FIG. 4.

FIG. 9 is a front view illustrating a roundness measuring device of a coating roll for battery manufacturing according to another embodiment of the present invention.

DETAILED DESCRIPTION OF THE EMBODIMENTS

Hereinafter, a detailed configuration of the present invention will be described in detail with reference to the accompanying drawings and various embodiments. The embodiments described below are illustratively shown to aid understanding of the present invention, the accompanying drawings are not drawn to scale to aid the understanding of the present invention, and dimensions of some components may be exaggerated.

The present invention may be modified into various forms and may have a variety of embodiments, and, therefore, specific embodiments will be illustrated in the drawings and a description thereof will be described in detail in the following description. The embodiments to be disclosed below, therefore, are not to be taken in a sense which limits the present invention to specific embodiments, and should be construed to include modifications, equivalents, or substitutes within the spirit and technical scope of the present invention.

A coating roll roundness measuring device of the present invention is a coating roll roundness measuring device, which supports an electrode sheet when the electrode sheet is coated with an electrode slurry, includes a displacement sensor spaced apart from the coating roll and configured to measure the roundness of the coating roll in a non-contact manner, and a support member in which a displacement sensor is installed and which extends in a length direction of the coating roll. The displacement sensor is installed as a plurality of displacement sensors in the support member in the length direction of the coating roll.

One of the main features of the present invention is that, as a coating roll roundness measuring device, a conventional contact-type dial gauge is excluded, and a displacement sensor, which is not brought into contact with the coating roll, is employed.

As the displacement sensor applicable to the present invention, an eddy current displacement sensor, an optical displacement sensor, an ultrasonic displacement sensor, a linear proximity sensor, a magnetoresistive displacement sensor, or the like may be applied. However, the present invention is not limited thereto, and any displacement sensor may be employed as long as it can measure an outer diameter of the coating roll in a non-contact manner.

As an example of the optical displacement sensor, a laser displacement sensor may be used. The laser displacement sensor includes a light projector for emitting a laser and a light receiver for receiving reflected light. The light projector emits a laser onto a surface of the coating roll, the light receiver receives reflected light and, simultaneously, measures an angle of the reflected light using a camera, and thus a distance (displacement) from the displacement sensor to the surface of the coating roll may be measured in a non-contact manner.

As shown in FIGS. 1 and 2, when the metal base is coated with the electrode slurry, since the coating roll is rotated to guide and support the metal base, the displacement sensor may consecutively measure outer diameters or radii of the coating roll at a set measurement point when the coating roll is rotated. The roundness of the coating roll may be determined from a series of outer diameter or radius values at the measurement point measured when the coating roll is rotated once. Even when the coating roll is rotated once, according to a variation in ambient temperature and a variation in temperature of the supplied electrode slurry, the outer diameter of the coating roll may vary in units of several micrometers. Accordingly, when the coating roll is rotated once, the roundness of the coating roll may be calculated from successive values of the outer diameter or radius measured by the displacement sensor. For example, when the coating roll is rotated once and successive displacement values of the outer diameter or the radius are measured using the displacement sensor on the basis of a measurement starting point as a reference point, variations in the outer diameter or radius may be expressed as numerical values. When the variation in the outer diameter or radius is within a predetermined range, no big problem in the roundness of a corresponding coating roll may be determined. However, when the variation in the outer diameter or radius exceeds the predetermined range, a problem occurs in the roundness of the coating roll, and it may be expected that there is an abnormality in the quality of the coated electrode slurry on the basis of the coating roll. That is, according to the present invention, the quality of an electrode slurry coating process can be predicted by measuring the roundness of the coating roll.

According to the present invention, the displacement sensor is installed as a plurality of displacement sensors in a support member extending along the length direction of the coating roll.

The coating roll may be manufactured in various sizes and lengths according to the type of electrode. Temperature uniformity according to the length direction of the coating roll determines the coating quality in a width direction of the electrode slurry. That is, even when the roundness of any one point in the length direction of the coating roll is within a predetermined range, and when the roundness at another point is out of the predetermined range, the coating quality in the width direction of the electrode slurry may be harmed. Therefore, according to the present invention, since the plurality of displacement sensors are installed in the length direction of the coating roll and the roundness at each point in the length direction of the coating roll is measured, the coating quality in the width direction of the electrode slurry can be predicted or managed. In addition, the roundness of the coating roll is related to the coating quality of the electrode slurry in the running direction (an MD direction), and the roundness in the length direction of the coating roll is related to the coating quality of the electrode slurry in the width direction (a TD direction). Thus, according to the present invention, the displacement sensor is installed as a plurality of displacement sensors disposed in the length direction of the coating roll so that it is possible to predict the coating quality of the electrode slurry in the running direction and the width direction.

In addition, when a total of three displacement sensors are installed at positions at a left side, a center, and a right side in the length direction of the coating roll, the coaxiality of the coating roll may be determined. That is, when three displacement sensors measure the roundness of three points of the coating roll, and when these roundness values are substituted into a predetermined equation, the straightness or coaxiality of the coating roll (that is, the degree to which the coating roll is not bent and is straightly located on the same axis) may be calculated. In order to obtain the number of variable values required for an equation for calculating coaxiality, it is necessary to measure roundness using at least three displacement sensors.

Meanwhile, according to the present invention, in order to install the plurality of displacement sensors, a support member extending in the length direction of the coating roll is included. The support member may be installed on a wall of a work room where the coating roll is installed or may be installed in a dedicated support frame.

As described above, according to the present invention, a plurality of non-contact displacement sensors are installed in the length direction of the coating roll, and thus the roundness or coaxiality of the coating roll may be measured to predict the coating quality or occurrence of an abnormality of the electrode slurry.

In addition, the coating quality can be improved by controlling an ambient temperature related to air conditioning or a temperature or a loading amount of the electrode slurry through pieces of roundness or coaxiality data. Alternatively, a heating unit may be installed in the coating roll to heat some or all of the coating roll to improve the roundness or coaxiality of the coating roll. In addition, it is possible to detect a replacement time point of the coating roll in advance through roundness and coaxiality data.

According to the present invention, since the displacement sensor may accurately measure the roundness of the coating roll in a non-contact manner, the roundness of a central portion of the coating roll, which is actually coated with the electrode slurry, may be directly measured, and the roundness may be measured without stopping a coating device at an actual operating speed of the coating device (e.g., 1.3 mm/sec). Therefore, according to the present invention, there is an advantage in that the coating quality can be managed by matching equipment data in real time.

A specific embodiment of the roundness measuring device of a coating roll for battery manufacturing of the present invention will be described in more detail below with reference to the accompanying drawings.

Modes of the Invention

First Embodiment

FIG. 4 is a front view illustrating a roundness measuring device 100 of a coating roll for battery manufacturing according to one embodiment of the present invention, FIG. 5 shows a perspective view and a side view of a micro stage 80 which is a component applied to the embodiment of FIG. 4, and FIG. 6 is a side view illustrating the roundness measuring device 100 of a coating roll for battery manufacturing according to the embodiment of FIG. 4.

In the embodiment of FIG. 4, a support member 60 is installed to extend in the length direction of the coating roll 20, and the support member 60 is coupled to dedicated support frames 70 installed adjacent to both ends of the coating roll 20. Alternatively, as long as an installation space permits, the support member 60 may be directly installed on inner walls of a coating process work room. As shown in FIG. 6, in the present embodiment, a pair of support members 60 are installed in parallel in the length direction of the coating roll 20 to stably support a displacement sensor 40.

The displacement sensor 40 is installed as a plurality of displacement sensors 40 on the support member 60 in the length direction of the coating roll 20. In the present embodiment, a total of three displacement sensors 40 are installed at positions at a left side, a center, and a right side of the coating roll 20. For example, when the coating roll 20 has a length of 1400 mm, a total of three displacement sensors 40 may be installed at a position of 300 mm, a position of 700 mm, and a position of 1100 mm from an end of the coating roll. As described above, when roundness is measured using the three displacement sensors 40, the coaxiality of the coating roll 20 can be obtained, and thus a distortion of a shaft of the coating roll may be determined.

Alternatively, in order to obtain the coaxiality of the coating roll 20, three or more displacement sensors 40 may be installed on the support member, as necessary. When the roundness is measured using more than three displacement sensors 40, more precise coaxiality can be obtained.

The shaft 21 of the coating roll 20 may be installed on the support frame 70, a separate support member, or side walls of the coating process work room.

As shown in FIGS. 4 and 6, in order to reduce a measurement error of the displacement sensor 40, the displacement sensor 40 is installed in a direction perpendicular to a central axis line of the coating roll 20. In particular, as well shown in FIG. 6, a height of the sensor and a height of the central axis line of the coating roll may be set collinearly, that is, an angle between the displacement sensor 40 and the central axis line of the coating roll may be set to be zero degrees.

Meanwhile, as shown in FIG. 6, the displacement sensor 40 is installed to face the coating roll 20 on a rear side of the electrode sheet 2 coated with the electrode slurry 1. It is also possible to install the displacement sensor 40 on the surface of electrode sheet 2. In this case, there may be a limit to more accurately measuring a variation in outer diameter due to contraction/expansion of the coating roll 20 resulting from an influence of surface expansion of the electrode slurry. Accordingly, as shown in FIG. 6, the support member 60 and the displacement sensor 40 of the present invention may be installed at the rear side of the electrode sheet 2.

The roundness measuring device 100 of the present embodiment is provided with a linear movement mechanism configured to move the displacement sensor 40 to the coating roll 20 or separate the displacement sensor 40 from the coating roll 20. That is, the linear movement mechanism is mounted on the support member 60, and the displacement sensor 40 is moved to or separated from the coating roll 20 by the linear movement mechanism.

The displacement sensors 40 are installed as a plurality of displacement sensors 40 in the length direction of the coating roll 20, and when an operator (a measuring person) needs to adjust the plurality of displacement sensors 40, the linear movement mechanism for moving the displacement sensor to the coating roll 20 is required. In particular, it is necessary to reduce a measurement error between operators by adjusting a distance between the displacement sensor and the coating roll within a predetermined range.

FIGS. 4 to 6 illustrate the micro stage 80 as an example of such a linear movement mechanism. In FIG. 4, the micro stage 80 is mounted on the support member 60 through a bracket 50, and the displacement sensor 40 is mounted on the micro stage 80.

FIG. 5 shows a perspective view (FIG. 5A) and a side view (FIG. 5B) of the micro stage 80. The micro stage 80 is a linear movement mechanism capable of moving the displacement sensor 40 by an extremely minute distance, and in present embodiment, the micro stage 80 has a forward and backward movement stroke of, for example, ±6.5 mm.

Specifically, the micro stage 80 includes an upper stage 81 and a lower stage 82, and the lower stage 82 is coupled to a fixing plate 85. The lower stage 82 and the fixing plate 85 are fixedly coupled to the bracket 50 installed on the support member 60.

The upper stage 81 is connected to a cylinder member 84 and is movable forward and backward by as much as a predetermined stroke according to forward and backward movement of the cylinder member 84. The cylinder member 84 is connected to a driver 83 and is movable forward and backward according to operation of the driver. The cylinder member 84 may have a built-in mechanical conversion mechanism for converting rotational movement into rectilinear movement by, for example, ball screw-ball nut coupling. Accordingly, the rotational movement of a motor, which is the driver 83, may be transmitted and converted into rectilinear movement of the cylinder member 84. Alternatively, in addition to the mechanical conversion mechanism, other conversion mechanisms may be employed in the micro stage 80, and detailed descriptions thereof will be omitted herein. In some cases, a rotation lever is employed as the driver 83 instead of the motor, and thus the cylinder member 84 may be moved forward and backward by rotating the rotation lever. The micro stage 80 is set to precisely control the forward and backward movement of the cylinder member 84 when rotational movement of a certain angle is transmitted by the driver 83. Accordingly, it is possible to move the cylinder member 84 by as much as a very small amount of stroke (e.g., several millimeters) which is difficult for a person to control. Due to the micro stage 80, it is possible to adjust the zero point of the displacement sensor 40.

FIGS. 7 and 8 are side views illustrating the operation of the micro stage and a zero point adjustment process of the displacement sensor 40 according to the embodiment of FIG. 4.

In the state of FIG. 6, the driver 83 is driven, and thus the cylinder member 84 is moved so that the upper stage 81 of the micro stage 80 approaches the displacement sensor 40. For convenience of description, although the micro stage 80 and the movement stroke of the displacement sensor 40 due to the micro stage 80 are exaggerated in the drawings, the stroke is actually very small (in the units of several millimeters). Accordingly, as shown in FIG. 7, the displacement sensor 40 approaches closer to the coating roll 20.

In addition, in the state of FIG. 6, when the driver 83 is driven, and thus the cylinder member 84 is moved so that the upper stage 81 of the micro stage 80 is moved away from the displacement sensor 40, the micro stage 80 becomes a state of FIG. 8. As in FIGS. 7 and 8, a distance between the displacement sensor and the coating roll may be within a predetermined distance range while the micro stage 80 is driven and the displacement sensor 40 is moved forward and backward to the coating roll 20. That is, the zero point of the displacement sensor 40 may be adjusted by the operation of the micro stage 80. For example, when a distance between the displacement sensor 40 and the coating roll 20 is within a predetermined range, a lamp (not shown) installed in the displacement sensor 40 is turned on, and thus it may be confirmed that the zero point of the displacement sensor 40 is adjusted. This predetermined range becomes a measurement reference position of the displacement sensor, and when the roundness of the coating roll is measured at the reference position, a roundness measurement error due to an operator (a measuring person) may be reduced. That is, even when any operator measures, when the zero point of the displacement sensor is adjusted by the forward and backward movement of the displacement sensor 40 by the micro stage 80, a measurement error of roundness or coaxiality according to the operator can be minimized.

Second Embodiment

FIG. 9 is a front view illustrating a roundness measuring device 200 of a coating roll for battery manufacturing according to another embodiment of the present invention.

In the present embodiment and the first embodiment, the same parts are given the same reference numerals, and detailed descriptions thereof will be omitted herein.

The second embodiment is different from the first embodiment in that predetermined magnet members 61 are installed at both ends of the support member 60 supporting the displacement sensor 40.

According to the specifications or type of the coating device, the support member 60 and the displacement sensor 40 may need to be installed in another coating device. Alternatively, even in the same coating device, when the coating roll is replaced, it is necessary to change an installation position of the displacement sensor 40. In this case, when the magnet members 61 are installed at both ends of the support member 60 and detached from the support frame 70, the displacement sensor 40 may be easily attached and detached.

In particular, when the magnet members 61 are attached to predetermined positions set on the support frame 70, the measurement position of the displacement sensor 40 is standardized, and thus a measurement error according to the measuring person may be reduced.

Therefore, according to the present embodiment, there is an advantage in that the displacement sensor 40 and the support member 60 may be easily attached and detached, and the zero point adjustment function by the micro stage 80 is organically combined to further minimize the measurement error according to the measuring person.

The roundness measuring method using the roundness measuring device 100 and 200 of a coating roll for battery manufacturing according to the present invention will be described in detail again.

First, the plurality of displacement sensors 40 are installed apart from the coating roll 20 in the length direction of the coating roll 20. In this case, the displacement sensor 40 may be installed at the rear side of electrode sheet 2 coated with the electrode slurry. In addition, the displacement sensor 40 is installed in a direction perpendicular to a central axis line of the coating roll 20, and thus a measurement error may be reduced.

After the displacement sensor 40 is installed, outer diameters of the coating roll at points facing the displacement sensors 40 is consecutively measured as the coating roll 20 is rotated.

Due to the continuous measurement of the outer diameter of the coating roll, a variation in outer diameter during one rotation of the coating roll, that is, roundness, is calculated.

When at least three displacement sensors 40 are installed at a left side, a center, and a right side of the coating roll 20, the roundness of the coating roll 20 is measured using the displacement sensors 40, and roundness values are substituted into a predetermined given equation, a degree of distortion of a shaft of the coating roll, that is, coaxiality, may be measured.

In addition, the displacement sensor 40 is installed to approach and to be separated from the coating roll 20, and thus even when the specifications or type of the coating roll is changed, the roundness of the coating roll can be accurately measured.

In particular, by mounting the displacement sensor 40 on the micro stage 80 and moving the displacement sensor forward and backward using the micro stage 80, the zero point of the displacement sensor 40 may be precisely adjusted, and thus measurement errors of roundness/coaxiality according to a measuring person can be minimized.

As described above, according to the present invention, by measuring the roundness or coaxiality of the coating roll in a non-contact manner, it is possible to predict the coating quality or occurrence of an abnormality of the electrode slurry. In addition, it is possible to measure the roundness of the central portion of the coating roll which is actually coated with the electrode slurry as well as the outer periphery of the coating roll according to the line operating speed of the actual coating device. Therefore, in connection with control of the coating apparatus, in-line measurement is possible, and it is possible to contribute to the improvement of coating quality by providing roundness data to a controller in real time.

In addition, by securing real-time data of the roundness/coaxiality, correlation analysis with equipment data such as a slurry loading amount, a slurry temperature, and an air conditioning temperature may be performed, and thus loading/coating process capability can be improved through the correlation analysis.

As described above, the present invention has been described in more detail with reference to the accompanying drawings and the embodiments. Therefore, the configurations described herein or shown in the drawings are merely one embodiment of the present invention and do not represent all the technical spirit of the present invention such that it should be understood that there may be various equivalents and modifications capable of replacing the embodiments and the configurations at the time of filing the present application.

DESCRIPTION OF REFERENCE NUMERALS

1: electrode slurry
2: metal base
10: slot die
11: lip
A: rotating roll
20: coating roll
21: coating roll shaft
30: dial gauge
31: measuring point
40: displacement sensor 50: bracket
60: support member
70: support frame
80: linear movement mechanism (micro stage)
81: upper stage
82: lower stage
83: driver
84: cylinder member
85: fixing plate
100 and 200: roundness measuring devices of a coating roll for battery manufacturing

The invention claimed is:

1. A roundness measuring device of a coating roll that supports an electrode sheet when the electrode sheet is coated with an electrode slurry, the roundness measuring device comprising:
   a displacement sensor spaced apart from the coating roll and configured to measure roundness of the coating roll in a non-contact manner;
   a support member on which a displacement sensor is installed, wherein the support member extends in a length direction of the coating roll, and
   a linear movement mechanism configured to move the displacement sensor forward and backward to allow the displacement sensor to approach and be separated from the coating roll,
   wherein the displacement sensor includes a plurality of displacement sensors on the support member in the length direction of the coating roll, and
   wherein the linear movement mechanism is mounted on the support member.

2. The roundness measuring device of claim 1, wherein the displacement sensor is installed at a rear side of the coating roll not in contact with the electrode sheet coated with the electrode slurry.

3. The roundness measuring device of claim 1, wherein the plurality of displacement sensor includes a total of three displacement sensors to face positions at a left side, a center, and a right side of the coating roll.

4. The roundness measuring device of claim 3, wherein coaxiality of the coating roll is measured through measurement of the roundness using the three displacement sensors.

5. The roundness measuring device of claim 1, wherein the displacement sensor is installed in a direction perpendicular to a central axis line of the coating roll.

6. The roundness measuring device of claim 1, wherein the support member is coupled to support frames installed adjacent to both ends of the coating roll.

7. The roundness measuring device of claim 1, wherein the linear movement mechanism includes a micro stage, and the displacement sensor is mounted on the micro stage to be moved forward and backward.

8. The roundness measuring device of claim 7, wherein a zero point of the displacement sensor is adjusted by the forward and backward movement of the displacement sensor by the micro stage.

9. The roundness measuring device of claim 6, wherein magnet members are installed at both ends of the support member, and the magnet members are attached at predetermined positions of the support frame.

10. A roundness measuring method of a coating roll for battery manufacturing, the roundness measuring method comprising:
    installing a plurality of displacement sensors in a length direction of a coating roll to be spaced apart from the coating roll;
    consecutively measuring outer diameters of the coating roll at positions facing the displacement sensors as the coating roll is rotated; and
    calculating roundness of the coating roll by consecutively measuring the outer diameters of the coating roll.

11. The roundness measuring method of claim 10, wherein
    the displacement sensors includes a total of three displacement sensors to face positions at a left side, a center, and a right side of the coating roll; and
    coaxiality of the coating roll is measured through measurement of the roundness using the three displacement sensors.

12. The roundness measuring method of claim 10, wherein the displacement sensors are installed in a direction perpendicular to a central axis line of the coating roll to measure the roundness of the coating roll.

13. The roundness measuring method of claim 10, wherein the roundness of the coating roll is measured using a displacement sensor installed to approach and be separated from the coating roll.

14. The roundness measuring method of claim 13, wherein the displacement sensor is mounted on a micro stage to be moved forward and backward by operation of the micro stage, and a zero point of the displacement sensor is adjusted by the forward and backward movement of the displacement sensor by the micro stage.

* * * * *